(12) United States Patent
Hamano et al.

(10) Patent No.: US 10,527,163 B2
(45) Date of Patent: Jan. 7, 2020

(54) CONTROL DEVICE FOR AUTOMATIC TRANSMISSION AND CONTROL METHOD FOR AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Masahiro Hamano, Atsugi (JP); Youji Itou, Sagamihara (JP); Haruka Kondo, Hatano (JP); Norihira Amano, Fuji (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 120 days.

(21) Appl. No.: 15/758,462

(22) PCT Filed: Sep. 14, 2016

(86) PCT No.: PCT/JP2016/077133
§ 371 (c)(1),
(2) Date: Mar. 8, 2018

(87) PCT Pub. No.: WO2017/051755
PCT Pub. Date: Mar. 30, 2017

(65) Prior Publication Data
US 2018/0283540 A1    Oct. 4, 2018

(30) Foreign Application Priority Data

Sep. 25, 2015    (JP) .................................. 2015-187743

(51) Int. Cl.
*F16H 61/12*     (2010.01)
*F16H 61/68*     (2006.01)
(Continued)

(52) U.S. Cl.
CPC ............. *F16H 61/12* (2013.01); *F16H 61/68* (2013.01); *F16H 59/36* (2013.01); *F16H 59/46* (2013.01);
(Continued)

(58) Field of Classification Search
None
See application file for complete search history.

(56) References Cited

U.S. PATENT DOCUMENTS 7,058,497 B2 * 6/2006 Nagata ..................... F16H 61/12
477/75
7,980,981 B2 * 7/2011 Kawaguchi ............. F16H 61/12
475/116
(Continued)

FOREIGN PATENT DOCUMENTS

JP     H07-139616 A     5/1995
JP     2002-310283 A    10/2002
(Continued)

*Primary Examiner* — Dirk Wright
(74) *Attorney, Agent, or Firm* — Foley & Lardner LLP

(57) ABSTRACT

The present invention is a control device for an automatic transmission, the control device being adapted to control the automatic transmission including a torque converter and a stepped transmission mechanism provided on a power transmission route from the torque converter to drive wheels, wherein while a non-driving range of the automatic transmission is selected, determination on interlock in the stepped transmission mechanism is executed on the basis of deceleration of an output shaft of the stepped transmission mechanism and a change in the torque converter.

7 Claims, 2 Drawing Sheets

(51) Int. Cl.
*F16H 59/46* (2006.01)
*F16H 59/48* (2006.01)
*F16H 59/36* (2006.01)

(52) U.S. Cl.
CPC ........ *F16H 59/48* (2013.01); *F16H 2059/467* (2013.01); *F16H 2061/1204* (2013.01); *F16H 2061/1256* (2013.01)

(56) References Cited

U.S. PATENT DOCUMENTS

| | | | |
|---|---|---|---|
| 8,560,190 B2 * | 10/2013 | Sugiura | F16H 61/12 |
| | | | 701/55 |
| 8,636,620 B2 * | 1/2014 | Nagashima | B60K 6/48 |
| | | | 477/5 |
| 2002/0147536 A1 | 10/2002 | Sugita | |
| 2008/0234088 A1 | 9/2008 | Kawaguchi et al. | |
| 2012/0078479 A1 | 3/2012 | Sugiura et al. | |

FOREIGN PATENT DOCUMENTS

| | | |
|---|---|---|
| JP | 2007-271017 A | 10/2007 |
| JP | 2008-232355 A | 10/2008 |

\* cited by examiner

CONTROL DEVICE FOR AUTOMATIC TRANSMISSION AND CONTROL METHOD FOR AUTOMATIC TRANSMISSION

TECHNICAL FIELD

The present invention relates to a control device and a control method for an automatic transmission. In detail, the present invention relates to a technique of detecting occurrence of interlock in a stepped transmission mechanism including plural friction engaging elements.

BACKGROUND ART

It is known that in a vehicle including a stepped transmission mechanism, when friction engaging elements to which no engagement commands are outputted are engaged, interlock where brake force is generated and the vehicle is decelerated although a driver does not depress a brake pedal occurs.

JP2008-232355 discloses a control device which detects occurrence of interlock where friction engaging elements to which no engagement commands are outputted are brought into an engaged state on the basis of deceleration of a vehicle, a command gear position to a stepped transmission mechanism, and an actual gear ratio which is a ratio of rotation speed of input and output shafts of the stepped transmission mechanism.

SUMMARY OF INVENTION

However, even by using the above technique, the occurrence of the interlock cannot be detected in a case where a non-driving range is selected as a shift range of the stepped transmission mechanism. This is because when the non-driving range is selected, a neutral instruction is issued to the stepped transmission mechanism for blocking power transmission, and the command gear position is not set. Even when the command gear position is set in a neutral state, the occurrence of the interlock cannot be detected by the above technique. The reason is as follows. The rotation speed of the input shaft of the stepped transmission mechanism is changed in accordance with a depressing amount of an accelerator pedal and meanwhile, the rotation speed of the output shaft of the stepped transmission mechanism is changed in accordance with vehicle speed. Thus, the actual gear ratio is changed in a situation of the vehicle. Therefore, even when the command gear position and the actual gear ratio are compared, a gap of the actual gear ratio with respect to the command gear position cannot be precisely determined.

Thus, an object of the present invention is to be able to detect occurrence of interlock even in a case where a stepped transmission mechanism is in a non-driving range.

According to an aspect of the present invention, a control device for an automatic transmission, the control device being adapted to control the automatic transmission including a torque converter and a stepped transmission mechanism provided on a power transmission route from the torque converter to drive wheels, is provided. In this aspect, while a non-driving range of the automatic transmission is selected, determination on interlock in the stepped transmission mechanism is executed on the basis of deceleration of an output shaft of the stepped transmission mechanism and a change in the torque converter.

According to another aspect of the present invention, a control method for an automatic transmission, the automatic transmission including a torque converter and a stepped transmission mechanism provided on a power transmission route from the torque converter to drive wheels, is provided. In this another aspect, while a non-driving range of the automatic transmission is selected, determination on interlock in the stepped transmission mechanism is executed on the basis of deceleration of an output shaft of the stepped transmission mechanism and a change in the torque converter.

According to the above aspects, even while the non-driving range is selected, the occurrence of the interlock can be detected.

DESCRIPTION OF EMBODIMENTS

Hereinafter, an embodiment of the present invention will be described with reference to the attached drawings.

Figure 1:
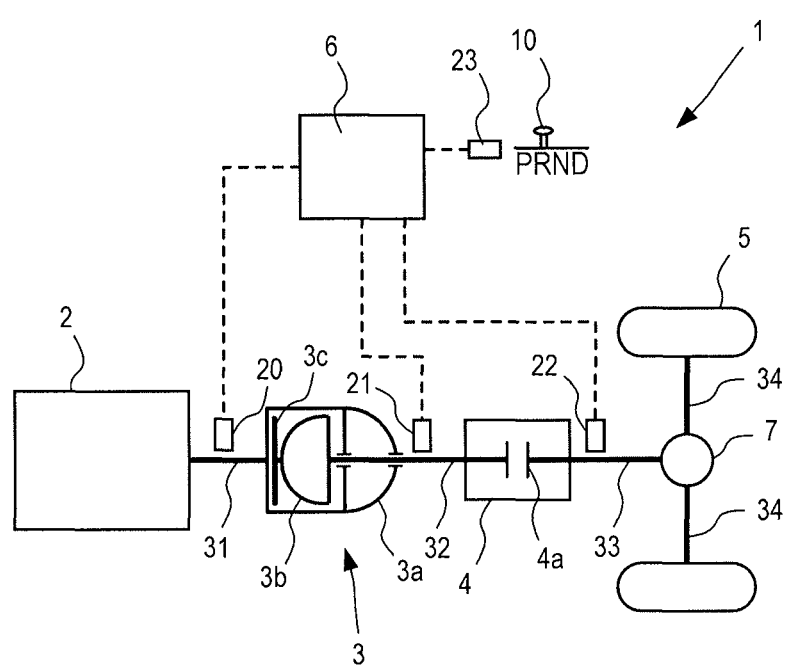
FIG. 1 is a schematic configuration diagram of a vehicle including an automatic transmission and a control device for the automatic transmission according to an embodiment of the present invention.

FIG. 1 is a block diagram showing a schematic configuration of a vehicle 1 including an automatic transmission 3, 4 and a control device 6 for the automatic transmission according to the embodiment of the present invention. In the present embodiment, an automatic stepped transmission is adopted as the automatic transmission 3, 4.

The vehicle 1 includes an engine 2, a torque converter 3, a stepped transmission mechanism 4, wheels 5, and a controller 6. The torque converter 3 and the stepped transmission mechanism 4 form the "automatic transmission" according to the present embodiment, and the controller 6 forms the "control device for the automatic transmission".

The torque converter 3 includes a pump impeller 3a and a turbine runner 3b. The pump impeller 3a is connected to an output shaft 31 of the engine 2, and the turbine runner 3b is connected to an input shaft 32 of the stepped transmission mechanism 4. Thereby, rotation generated in the engine 2 is inputted to the pump impeller 3a of the torque converter 3, and outputted to the stepped transmission mechanism 4 from the turbine runner 3b fluid-coupled to the pump impeller 3a. The torque converter 3 includes a lockup clutch 3c capable of mechanically connecting the pump impeller 3a and the turbine runner 3b. The lockup clutch 3c is engaged for example when a shift lever 10 is placed in a D (driving) range and vehicle speed becomes predetermined vehicle speed or more, to directly combine the output shaft 31 of the engine 2 and the output shaft 32 of the torque converter 3 and connect the pump impeller 3a and the turbine runner 3b. The output shaft 32 of the torque converter 3 also serves as the input shaft of the stepped transmission mechanism 4. The lockup clutch 3c is disengaged in a case where the shift lever 10 is placed in a non-driving range, specifically, a P (parking) range or an N (neutral) range. The lockup clutch 3c is also disengaged even in a case where the shift lever 10 is placed in the D range but when the vehicle speed becomes low vehicle speed which is lower than the predetermined vehicle speed.

The stepped transmission mechanism 4 is provided on a power transmission route from the torque converter 3 to the wheels 5. The stepped transmission mechanism 4 forms, for example, an automatic stepped transmission of nine forward speeds and one reverse speed. The stepped transmission mechanism 4 has plural planetary gears and plural friction engaging elements (clutch, brake) 4a. By switching an engaging/disengaging state of the friction engaging elements 4a by controlling hydraulic pressure supplied to the plural friction engaging elements 4a, a gear position is changed. In the stepped transmission mechanism 4, the rotation of the engine 2 is transmitted to the input shaft 32 via the torque converter 3, and rotation in accordance with the gear position (gear ratio) formed by engaging or disengaging the plural friction engaging elements 4a is outputted from an output shaft 33. Engagement of the friction engaging elements 4a indicates a state where the power can be transmitted in the friction engaging elements 4a, and includes a slip state where the friction engaging elements are not completely engaged.

The rotation outputted from the stepped transmission mechanism 4 is transmitted to the wheels 5 via a differential device 7 and a drive shaft 34.

The controller 6 is formed by a microcomputer including a CPU, a ROM, a RAM, etc. The controller 6 may be formed by plural microcomputers.

A signal from an engine rotation speed sensor 20, a signal from a turbine rotation speed sensor 21, a signal from a vehicle speed sensor 22, a signal from an inhibitor switch 23, etc. are inputted to the controller 6. On the basis of these signals, a program stored in the ROM is executed, and a fuel injection timing to the engine 2, a gear position switching control signal, etc. are outputted. The engine rotation speed sensor 20 detects rotation speed of the output shaft 31 of the engine 2, and the turbine rotation speed sensor 21 detects rotation speed of the input shaft 32 of the stepped transmission mechanism 4 as rotation speed of the turbine runner 3b of the torque converter 3. The vehicle speed sensor 22 detects rotation speed of the output shaft 33 of the stepped transmission mechanism 4.

In the stepped transmission mechanism 4, by changing the engaging/disengaging state of the plural friction engaging elements 4a, the gear position is changed. In such a stepped transmission mechanism 4, when the friction engaging elements 4a to which disengagement is instructed are engaged, brake force is generated even in a case where a driver does not depress a brake pedal, and the vehicle is decelerated. Hereinafter, such a state will be called as interlock.

In the present embodiment, interlock determination control to determine occurrence of the interlock in a case where the shift lever 10 is placed in the non-driving range such as the N range or the P range is executed. Hereinafter, the interlock determination control in the non-driving range will be described with reference to FIG. 2.

Figure 2:
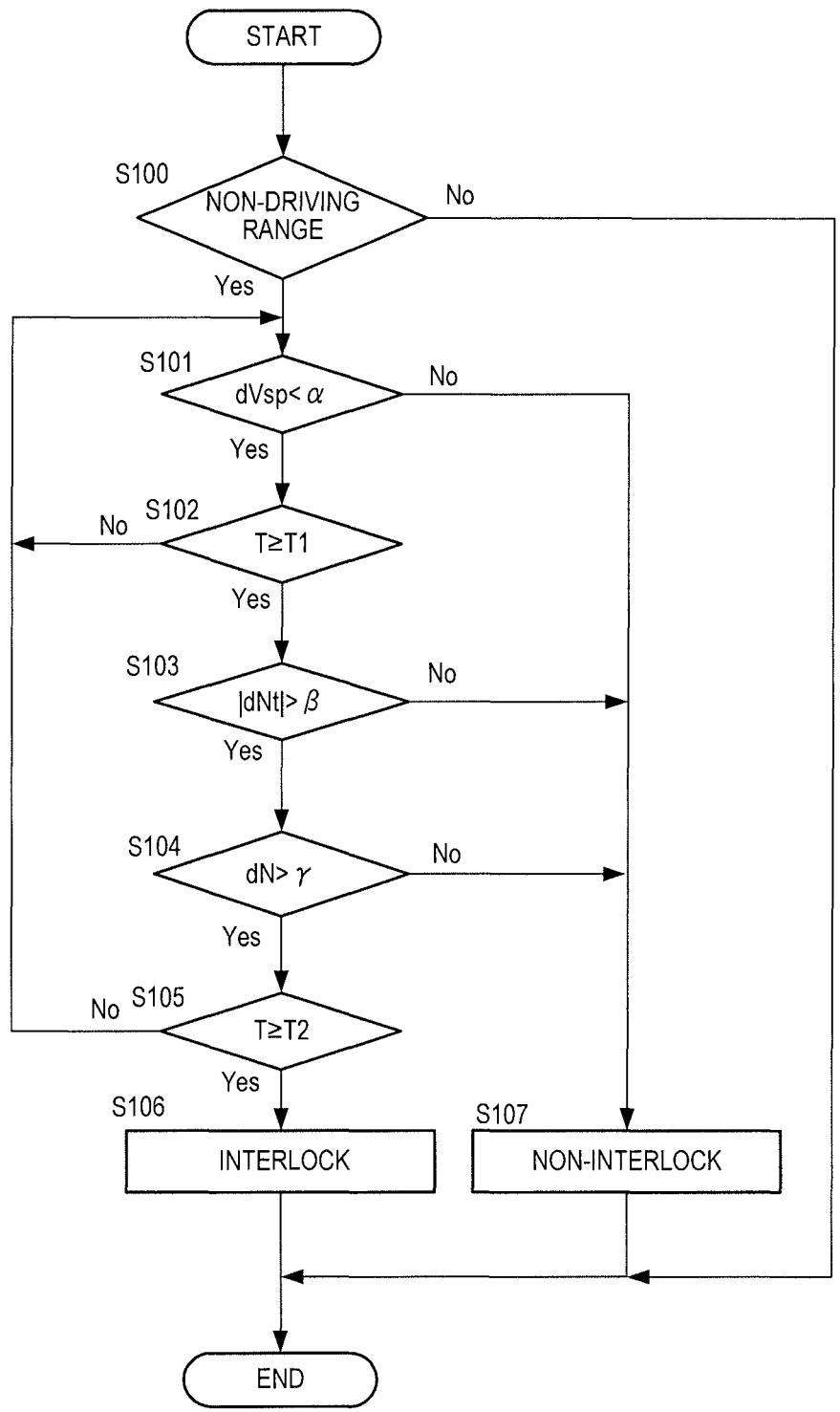
FIG. 2 is a flowchart for illustrating interlock determination control in a non-driving range, the interlock determination control to be executed by the control device according to the above embodiment.

FIG. 2 is a flowchart for illustrating the interlock determination control in the non-driving range. The interlock in the non-driving range can occur when control failure of hydraulic pressure to friction engaging elements 4a is caused, for example in a case where the vehicle 1 does not include a manual valve. Even in a case where the vehicle 1 includes the manual valve, the interlock in the non-driving range can occur in a case where valve sticking, etc. occurs and control failure of hydraulic pressure to friction engaging elements 4a is caused, etc.

In Step S100, the controller 6 determines whether or not the shift lever 10 is placed in the non-driving range on the basis of the signal from the inhibitor switch 23. In a case where the shift lever 10 is placed in the non-driving range, the process is forwarded to Step S101. In a case where the shift lever 10 is not placed in the non-driving range, the current process is ended.

In Step S101, the controller 6 calculates deceleration dVsp of the output shaft 33 of the stepped transmission mechanism 4 on the basis of the signal from the vehicle speed sensor 22, and determines whether or not the deceleration dVsp is smaller than predetermined deceleration $\alpha$.

The controller 6 calculates rotation speed No of the output shaft 33 of the stepped transmission mechanism 4 on the basis of the signal from the vehicle speed sensor 22, and calculates the deceleration dVsp on the basis of the rotation speed No calculated in the current process and rotation speed No stored in the controller 6 (for example, the rotation speed No calculated in the previous process). The deceleration dVsp is a reduction ratio of the rotation speed No calculated in the current process with respect to the stored rotation speed No. The deceleration is calculated by subtracting the stored rotation speed No from the rotation speed No calculated in the current process. Therefore, in a case where the deceleration dVsp is a negative value, it indicates that the vehicle 1 is decelerating. As the deceleration dVsp is reduced more, it indicates that the vehicle 1 is decelerating more. The predetermined deceleration $\alpha$ is a preliminarily set negative value with which it can be determined that the vehicle 1 is decelerating. In a case where the deceleration dVsp is smaller than the predetermined deceleration $\alpha$ and the vehicle 1 is decelerating, the process is forwarded to Step S102. In a case where the deceleration dVsp is the predetermined deceleration $\alpha$ or more and the vehicle 1 is not decelerating, the process is forwarded to Step S107. The rotation speed No calculated in the current process is stored in the controller 6. When the deceleration dVsp becomes smaller than the predetermined deceleration $\alpha$, the controller 6 starts counting by a timer.

In the present embodiment, the deceleration dVsp is calculated by subtracting the stored rotation speed No from the rotation speed No calculated in the current process. However, for example, the deceleration may be calculated by dividing the stored rotation speed No by the rotation speed No calculated in the current process.

In a case where the deceleration dVsp is smaller than the predetermined deceleration $\alpha$, the controller 6 executes the following process in order to monitor a change in the torque converter 3 for determination on the interlock.

In Step S102, the controller 6 determines whether or not a value T of the timer becomes a first time period T1 or more. The first time period T1 is a preliminarily set time, the time until when the vehicle is transitioned into an interlock state in a case where the interlock occurs. When the value T of the timer becomes the first time period T1 or more, the process is forwarded to Step S103. In a case where the value T of the timer is less than the first time period T1, the process is returned to Step S101.

When the value T of the timer becomes the first time period T1 or more, a period of transition into the interlock state is past, and the vehicle is transitioned into the interlock state, the controller 6 starts the process in Step S103.

In Step S103, a change rate dNt of turbine rotation speed Nt which is the change in the torque converter 3 is calculated, and whether or not an absolute value of the change rate dNt is greater than a first predetermined value $\beta$ is determined. The change in the torque converter 3 includes the change rate dNt of the rotation speed of the output shaft of the torque converter 3 (rotation speed of the input shaft 32 of the stepped transmission mechanism 4 in the present embodiment) and a slip amount dN in the torque converter 3. The controller 6 calculates the turbine rotation speed Nt on the basis of the signal from the turbine rotation speed sensor 21, and calculates the change rate dNt of the turbine rotation speed Nt on the basis of the turbine rotation speed Nt calculated in the current process, and turbine rotation speed Nt stored in the controller 6 such as turbine rotation speed Nt calculated in the previous process. The change rate dNt is calculated by subtracting the turbine rotation speed Nt calculated in the current process from the stored turbine rotation speed Nt. The turbine rotation speed Nt calculated in the current process is stored in the controller 6. The first predetermined value β is a preliminarily set value.

In a case where the shift lever 10 is placed in the non-driving range and no interlock occurs in the stepped transmission mechanism 4, power transmission is blocked in the friction engaging elements 4a to which disengagement is instructed. Thus, even when the deceleration dVsp is reduced, the turbine rotation speed Nt is unchanged. For example, even in a case where the driver depresses the brake pedal, the turbine rotation speed Nt is unchanged. 0

However, even in a case where the shift lever 10 is placed in the non-driving range but the interlock occurs, and when the deceleration dVsp is reduced, that is, the vehicle speed is lowered, the turbine rotation speed Nt is changed along with the lowered vehicle speed. Therefore, when the interlock occurs while the non-driving range is selected, the absolute value of the change rate dNt of the turbine rotation speed Nt is increased. There is sometimes a case where depending on the type of the friction engaging elements 4a with which the interlock occurs in the stepped transmission mechanism 4, the turbine rotation speed Nt is increased. Therefore, in Step S103, the absolute value of the change rate dNt and the first predetermined value β are compared.

In Step S103, the controller 6 determines a possibility of the occurrence of the interlock on the basis of the change rate dNt of the turbine rotation speed Nt. In a case where the absolute value of the change rate dNt of the turbine rotation speed Nt is greater than the first predetermined value β, the process is forwarded to Step S104. In a case where the absolute value of the change rate dNt of the turbine rotation speed Nt is the first predetermined value β or less, the process is forwarded to Step S107.

In Step S104, the controller 6 calculates the slip amount dN in the torque converter 3 which is the change in the torque converter 3, and determines whether or not the slip amount dN is greater than a second predetermined value γ. The slip amount dN is an absolute value of a rotation speed difference between the input shaft 31 and the output shaft 32 of the torque converter 3. The controller 6 calculates engine rotation speed Ne on the basis of the signal from the engine rotation speed sensor 20, and calculates the slip amount dN by subtracting the turbine rotation speed Nt calculated in the current process from the calculated engine rotation speed Ne. The second predetermined value γ is a preliminarily set value which is the rotation speed difference capable of being obtained in a case where no interlock occurs.

In a case where an accelerator pedal is operated, the turbine rotation speed Nt is changed in accordance with a change in the engine rotation speed Ne. Thus, even in a case where the absolute value of the change rate dNt of the turbine rotation speed Nt is greater than the first predetermined value β in Step S103, there is sometimes a case where the change in the turbine rotation speed Nt is caused by the operation of the accelerator pedal.

In a case where the shift lever 10 is placed in the non-driving range, the lockup clutch 3c is disengaged. In a case where the lockup clutch 3c is disengaged and no interlock occurs, no load is applied to the turbine runner 3b. Thus, even in a case where the accelerator pedal is operated, the slip amount dN is stabilized to be the second predetermined value γ or less.

However, when the interlock occurs, a load is applied to the turbine runner 3b. Thus, the change in the turbine rotation speed Nt is decreased with respect to the change in the engine rotation speed Ne (in other words, the turbine rotation speed Nt is not changed following the change in the engine rotation speed Ne), and the slip amount dN becomes greater than the second predetermined value γ.

In Step S104, in a case where the slip amount dN is greater than the second predetermined value γ, the controller 6 determines that a load is applied to the turbine runner 3b and the interlock possibly occurs. In a case where the slip amount dN is greater than the second predetermined value γ, the process is forwarded to Step S105. In a case where the slip amount dN is the second predetermined value γ or less, the process is forwarded to Step S107.

In such a way, in a case where the absolute value of the change rate dNt of the turbine rotation speed Nt is greater than the first predetermined value β, and the slip amount dN is greater than the second predetermined value γ, the controller 6 determines that the change in the torque converter 3 is abnormal and the interlock occurs in the stepped transmission mechanism 4.

In Step S105, whether or not the value T of the timer is a second time period (first predetermined time period) T2 or more is determined. The second time period T2 is a preliminarily set time, the time with which the occurrence of the interlock can be determined. In a case where the value T of the timer is the second time period T2 or more, the process is forwarded to Step S106. In a case where the value T of the timer is less than the second time period T2, the process is returned to Step S101.

In Step S106, the controller 6 determines that the interlock occurs in the non-driving range. When a state where the deceleration dVsp is smaller than the predetermined deceleration α is continued for the second time period T2 or longer, and further, an abnormal state where the absolute value of the change rate dNt of the turbine rotation speed Nt is greater than the first predetermined value β and the slip amount dN exceeds the second predetermined value γ is continued for a third time period (second predetermined time period) T3 or longer, the controller determines that the interlock occurs in the non-driving range. The third time period T3 is a time from when the vehicle is transitioned into the interlock state in a case where the interlock occurs until when the second time period T2 comes. Counting of the third time period T3 is started from the latter half of a counting period of the second time period T2. Determination in Step S103 and Step S104 is not done in the period of transition into the interlock state but done after the vehicle is transitioned into the interlock state.

The controller 6 may start counting by the timer when the absolute value of the change rate dNt of the turbine rotation speed Nt is greater than the first predetermined value β, and compare the value of the timer and the third time period T3.

While the non-driving range is selected, in order to improve a starting property of the vehicle in a case where a driving range is selected by operation of the shift lever 10 after that, a part of (for example, one of) the plural friction engaging elements 4a engaged to form a gear position in accordance with the vehicle speed are disengaged, and the remaining friction engaging elements 4a are engaged. In a case of determining the occurrence of the interlock in the non-driving range, the controller 6 outputs an instruction to disengage all the plural friction engaging elements 4a forming the gear position to the stepped transmission mechanism 4 in order to cancel the interlock state. Thereby, the interlock can be reliably canceled.

In Step S107, the controller 6 determines that no interlock occurs in the non-driving range.

The effects obtained by the present embodiment will be described below.

In a case where the shift lever 10 is placed in the non-driving range, it is determined that the vehicle 1 is decelerating on the basis of the deceleration dVsp of the output shaft 33 of the stepped transmission mechanism 4. It is determined that a load is applied to the output shaft of the torque converter 3 (input shaft 32 of the stepped transmission mechanism 4) on the basis of the change in the torque converter 3. When these conditions are met, the occurrence of the interlock is determined. In such a way, even in a case where the shift lever 10 is placed in the non-driving range, the occurrence of the interlock in the stepped transmission mechanism 4 can be determined.

On the basis of the change rate dNt of the turbine rotation speed Nt, the occurrence of the interlock in the stepped transmission mechanism 4 is determined. When the interlock occurs while the non-driving range is selected, the power is transmitted in the stepped transmission mechanism 4. Thus, the change rate dNt of the turbine rotation speed Nt at the time of deceleration is increased. From such a viewpoint, on the basis of the change rate dNt of the turbine rotation speed Nt, the occurrence of the interlock in the stepped transmission mechanism 4 can be determined.

On the basis of the slip amount dN of the torque converter 3, the occurrence of the interlock in the stepped transmission mechanism 4 is determined. In a case where no interlock occurs while the non-driving range is selected, no load is applied to the turbine runner 3b from the side of the stepped transmission mechanism 4. Thus, the slip amount dN is suppressed to be the second predetermined value $\gamma$ or less. However, when the interlock occurs while the non-driving range is selected, a load is applied to the turbine runner 3b from the side of the stepped transmission mechanism 4 via the input shaft 32. Thus, the slip amount dN exceeds the second predetermined value $\gamma$. From such a viewpoint, on the basis of the slip amount dN of the torque converter 3, the occurrence of the interlock in the stepped transmission mechanism 4 can be determined.

Even while the non-driving range is selected, the turbine rotation speed Nt is changed in accordance with the change in the engine rotation speed Ne caused by the operation of the accelerator pedal. By determining the occurrence of the interlock on the basis of the change rate dNt of the turbine rotation speed Nt, and in addition, of the slip amount dN of the torque converter 3, detection precision of the interlock can be improved.

In a case where the state where the deceleration dVsp of the output shaft 33 of the stepped transmission mechanism 4 is smaller than the predetermined deceleration $\alpha$ is continued for the second time period T2 or longer, and the abnormal state where the absolute value of the change rate dNt of the turbine rotation speed Nt is greater than the first predetermined value $\beta$ and the slip amount dN is greater than the second predetermined value $\gamma$ is continued for the third time period T3, it is determined that the interlock occurs while the non-driving range is selected. The counting of the third time period T3 is performed in the latter half of the counting period of the second time period T2. Thereby, in a case where the interlock occurs, the determination on the interlock in the period of transition into the interlock state is prevented, and the determination on the interlock is performed after the vehicle is transitioned into the interlock state. Therefore, the detection precision of the interlock while the non-driving range is selected can be improved.

In the stepped transmission mechanism 4, normally, when the non-driving range is selected, in order to prepare for selection of the driving range after that, only one friction engaging element 4a among the plural friction engaging elements 4a engaged to form the gear position at the time of driving is disengaged, and the remaining friction engaging elements 4a are engaged. Thereby, the starting property at the time of selection of the driving range can be improved. However, in a case of controlling the stepped transmission mechanism 4 in such a way, when the friction engaging elements 4a which should be disengaged originally are engaged, the interlock occurs easily.

In the present embodiment, in a case where it is determined that the interlock occurs while the non-driving range is selected, the stepped transmission mechanism 4 is instructed to disengage all the plural friction engaging elements 4a engaged to form the gear position in accordance with the vehicle speed, for example. Thereby, the interlock can be reliably canceled.

In the above description, the stepped transmission mechanism 4 having the plural friction engaging elements 4a is described. However, the automatic transmission to which the present invention is applied is not limited to this. For example, the present invention can be applied to all over automatic transmissions having plural friction engaging elements such as an automatic continuously variable transmission in which a continuously variable transmission mechanism and a sub-transmission mechanism serving as a stepped transmission mechanism having plural friction engaging elements are combined.

Modes extracted from the above description, the modes being not described in the claims will be described.

A control device for an automatic transmission, the control device being adapted to control the automatic transmission including a torque converter and a stepped transmission mechanism provided on a power transmission route from the torque converter to drive wheels, wherein in a case where a non-driving range of the automatic transmission is selected, determination on interlock in the stepped transmission mechanism is executed on the basis of a change in the torque converter during deceleration of a vehicle. Regarding the change in the torque converter, an abnormal state of the change can be determined on the basis of turbine rotation speed of the torque converter.

A control device for an automatic transmission including a stepped transmission mechanism having plural friction engaging elements adapted to connect and disconnect an output shaft of an engine and drive axles of wheels, the stepped transmission mechanism being adapted to transmit engine torque to the drive axles at a predetermined reduction ratio in accordance with combination of engagement and disengagement between the plural friction engaging elements, wherein whether or not the automatic transmission is in a non-driving range is determined, rotation speed of an input shaft of the stepped transmission mechanism is detected as input shaft rotation speed, and whether or not interlock where a part of the plural friction engaging elements to which disengagement is instructed in the non-driving range are engaged occurs is determined on the basis of the input shaft rotation speed when the automatic transmission is in the non-driving range.

The control device for the automatic transmission, wherein rotation speed of an output shaft of the stepped transmission mechanism is detected as output shaft rotation speed, and occurrence of the interlock is determined on the basis of the input shaft rotation speed and the output shaft rotation speed when the automatic transmission is in the non-driving range.

The control device for the automatic transmission, wherein it is determined that the interlock occurs in a case where a change amount of the input shaft rotation speed exceeds a first value with respect to a change in the output shaft rotation speed when the automatic transmission is in the non-driving range. The first predetermined value β in the above embodiment is shown as an example of the "first value".

The control device for the automatic transmission further including a torque converter, the torque converter including a lockup clutch adapted to block connection between the output shaft of the engine and the input shaft of the stepped transmission mechanism under the non-driving range, wherein rotation speed of the output shaft of the engine is detected as engine rotation speed, and the occurrence of the interlock is determined on the basis of the input shaft rotation speed and the engine rotation speed when the automatic transmission is in the non-driving range.

The control device for the automatic transmission including the torque converter, wherein it is determined that the interlock occurs in a case where the change amount of the input shaft rotation speed is smaller than a second value with respect to a change in the engine rotation speed when the automatic transmission is in the non-driving range. A value obtained by subtracting the second predetermined value γ from a change amount of the engine rotation speed Ne in the above embodiment (=ΔNe−γ) is shown as an example of the "second value". The change amount ΔNe of the engine rotation speed Ne is, for example, a value obtained by subtracting engine rotation speed calculated in the previous process from the engine rotation speed Ne calculated in the current process.

The control device for the automatic transmission, wherein a signal to disengage all the plural friction engaging elements is outputted when it is determined that the interlock occurs.

The embodiment of the present invention is described above. However, the description of the above embodiment does not intend to limit the technical scope of the present invention to the specific configurations of the above embodiment but only indicates part of application examples of the present invention.

The present application claims a priority of Japanese Patent Application No. 2015-187743 filed with the Japan Patent Office on Sep. 25, 2015, all the contents of which are hereby incorporated by reference.

The invention claimed is:

1. A control device for an automatic transmission, the control device being adapted to control the automatic transmission included in a vehicle and including a torque converter and a stepped transmission mechanism provided on a power transmission route from the torque converter to drive wheels, wherein while a non-driving range of the automatic transmission is selected, and when deceleration of an output shaft of the stepped transmission mechanism is smaller than a predetermined negative value, determination on interlock in the stepped transmission mechanism is executed on the basis of a change in the torque converter, the deceleration of the output shaft of the stepped transmission mechanism is a negative value which reduces more as the vehicle is decelerating more.

2. The control device for the automatic transmission according to claim 1, wherein rotation speed of the output shaft of the torque converter is detected, and the change in the torque converter is calculated on the basis of a change rate of the rotation speed of the output shaft of the torque converter.

3. The control device for the automatic transmission according to claim 1, wherein a slip amount of the torque converter is detected, and the change in the torque converter is calculated on the basis of the slip amount of the torque converter.

4. The control device for the automatic transmission according to claim 1, wherein in the determination on the interlock, it is determined that a state where the deceleration of the output shaft of the stepped transmission mechanism is smaller than the predetermined negative value is continued for a first predetermined time period or longer and further, an abnormal state of the change in the torque converter is continued for a second predetermined time period or longer, the second predetermined time period being shorter than the first predetermined time period, and in the latter half of a counting period of the first predetermined time period, counting of the second predetermined time period is started.

5. The control device for the automatic transmission according to claim 1 in which the stepped transmission mechanism has plural friction engaging elements, wherein when the non-driving range is selected, a part of the plural friction engaging elements adapted to be engaged at the time of selection of a driving range are disengaged, and when the non-driving range is selected and it is determined that the interlock occurs, all the plural friction engaging elements are disengaged.

6. A control method for an automatic transmission, the automatic transmission included in a vehicle and including a torque converter and a stepped transmission mechanism provided on a power transmission route from the torque converter to drive wheels, the control method comprising:

executing determination on interlock in the stepped transmission mechanism on the basis of a change in the torque converter while a non-driving range of the automatic transmission is selected, and when deceleration of an output shaft of the stepped transmission mechanism is smaller than a predetermined negative value, the deceleration of the output shaft of the stepped transmission mechanism is a negative value which reduces more as the vehicle is decelerating more.

7. A control device for an automatic transmission, the control device being adapted to control the automatic transmission included in a vehicle and including a torque converter and a stepped transmission mechanism provided on a power transmission route from the torque converter to drive wheels, wherein while a non-driving range of the automatic transmission is selected, and when deceleration of an output shaft of the stepped transmission mechanism is smaller than a predetermined negative value, determination on interlock in the stepped transmission mechanism is executed on the basis of a change in the torque converter, the deceleration of the output shaft of the stepped transmission mechanism is a negative value which reduces more as the vehicle is decelerating more.

* * * * *